US005870721A

United States Patent [19]
Norris

[11] Patent Number: 5,870,721
[45] Date of Patent: Feb. 9, 1999

[54] SYSTEM AND METHOD FOR REAL TIME LOAN APPROVAL

[75] Inventor: Jeffrey A. Norris, Lexington, S.C.

[73] Assignee: Affinity Technology Group, Inc., Columbia, S.C.

[21] Appl. No.: 729,892

[22] Filed: Oct. 15, 1996

Related U.S. Application Data

[63] Continuation of Ser. No. 346,350, Nov. 29, 1994, abandoned, which is a continuation of Ser. No. 113,205, Aug. 27, 1993, abandoned.

[51] Int. Cl.$^6$ .................................................. G06F 17/60
[52] U.S. Cl. .............................. 705/38; 705/35; 705/39; 705/42; 705/43
[58] Field of Search ..................................... 395/238, 239, 395/237, 235, 236, 242, 243, 244; 705/35, 38, 39, 42, 43

[56] References Cited

U.S. PATENT DOCUMENTS

| | | |
|---|---|---|
| 3,970,992 | 7/1976 | Boothroyd . |
| 4,491,725 | 1/1985 | Pritchard . |
| 4,598,367 | 7/1986 | DeFrancesco . |
| 4,646,250 | 2/1987 | Childress . |
| 4,648,037 | 3/1987 | Valentino . |
| 4,649,832 | 3/1987 | Hain et al. ............................. 109/24.1 |
| 4,730,252 | 3/1988 | Bradshaw . |
| 4,890,228 | 12/1989 | Longfield ................................ 364/408 |
| 5,049,862 | 9/1991 | Dao et al. . |
| 5,193,057 | 3/1993 | Longfield ................................ 364/408 |
| 5,202,825 | 4/1993 | Miller et al. . |
| 5,218,539 | 6/1993 | Elphick et al. ......................... 364/419 |
| 5,220,501 | 6/1993 | Lawlor et al. . |
| 5,231,571 | 7/1993 | D'Agostino . |
| 5,239,462 | 8/1993 | Jones et al. ............................. 364/408 |

(List continued on next page.)

FOREIGN PATENT DOCUMENTS 5101250   4/1993   Japan .

OTHER PUBLICATIONS

Mortgage Ware 5.4d—Interlinq Software Co 11255 Kirkland Way, Kirkland, WA 98033—Judith M. Berrett (206) 827–1112; (800) 569–1234.

Electronic Network Will Link Car Dealers to Many Lenders: Goal is to Create a Form of EFT Transfer System, American Banker, Feb. 8, 1988 p. 1, vol. 153, No. 26.

Servantis Systems Inc.; "PEP+(Paperless Processing Plus)", DIALOG(R)File 256 (01513881), Jan. 1986.

Computrol, Inc.; "Standing Order System (SOS)"; DIALOG(R)File 751 (00239695); 1988.

Management Technologies Inc (MTI); "ManTec 3.4"; DIALOG(R)File 01198196; 1982.

(List continued on next page.)

Primary Examiner—Gail O. Hayes
Assistant Examiner—William N. Hughet
Attorney, Agent, or Firm—Rhodes, Coats & Bennett, L.L.P.

[57] ABSTRACT

A method and apparatus for closed loop, automatic processing a loan, including completion of the application, underwriting, and transferring funds, includes use of a programmed computer to interface with an applicant, obtain the information needed to process the loan, determine whether to approve the loan, and effect electronic fund transfers to the applicant's deposit account and arrange for automatic withdrawals to repay the loan. Information is received from the applicant preferably by using voice recognition technology but alternatively by entering the alphanumeric information using a personal computer keyboard or using the buttons on a telephone. The loan approval determination is made using a neural network with input obtained in part from the applicant and in part from databases accessed by the computer, such as a credit bureau, to obtain a credit report. The loan agreement is transmitted by facsimile to and from the applicant when the applicant has access to a facsimile machine or datafile to be printed or to an agent who delivers the agreement to the applicant when the applicant does not have access. In a preferred embodiment, the applicant accesses the computer from a kiosk where the complete transaction can take place as the applicant waits.

30 Claims, 2 Drawing Sheets

U.S. PATENT DOCUMENTS

| | | | |
|---|---|---|---|
| 5,241,620 | 8/1993 | Ruggiero | 395/22 |
| 5,274,547 | 12/1993 | Zoffel et al. | 364/408 |
| 5,297,202 | 3/1994 | Kapp et al. | |
| 5,361,201 | 11/1994 | Jost et al. | 395/235 |
| 5,559,895 | 9/1996 | Lee et al. | 382/119 |
| 5,604,341 | 2/1997 | Grossi et al. | 235/379 |
| 5,611,052 | 3/1997 | Dykstra et al. | 395/238 |

OTHER PUBLICATIONS

Rothfeder, Jeffrey; "Electronic Bill–Paying for the Little Guy"; Businesss Week; Sep. 25, 1989; p. 206E.

Patrick Haverson, A Man with Grand Visions, Bakning Technology, pp. 30–32, May 1993.

Anonymous, MortgageWare Resource Guide, Interlinq Software Corp., Nov. 1992.

David O. Tyson, Interlinq Mortgage Software Hits Big Time with Prudential Real Estate Susidiary Deal, Nov. 18, 1987.

Richard Read, Crossing the Track to Success, Euromoney, pp. 1–8, Jun. 1988.

Karson, Daniel E., "A Private Investigator's Guide to On–Covering Concealed Assets"; Mar. 4, 1987; p. 6, vol. 52, No. 43.

Russell, Rebecca D., "Keeping the Pieces Together", Security, V28N5, May 1991, V2N5 Abstract.

Barchard, David, "Cautious Mortgage Lenders Redo Their Sums", Financial Times, Sat., Jun. 20, 1972, p. 6.

"Neural Networks: A Logical Progression in Credit and Marketing Decisions Systems", Credit World, Mar./Apr. 1993, pp. 26–33, Alan Jost.

SYSTEM AND METHOD FOR REAL TIME LOAN APPROVAL

This is a file wrapper continuation of application Ser. No. 08/346,350, filed Nov. 29, 1994, which is a file wrapper continuation application of application Ser. No. 08/113,205 filed on Aug. 27, 1993 both now abandoned.

BACKGROUND OF THE INVENTION

1. Field of the Invention

The present invention relates generally to closed loop financial transactions. More specifically, the present invention is a method and apparatus for processing loans automatically, beginning with the loan application and continuing through to transfer of funds to the borrower and to arranging for repayment.

2. Discussion of Background

Borrowed money is essential to facilitate commerce and personal finance. Individuals and businesses borrow money on both a short term and a long term basis for better management of their day-to-day financial transactions and to obtain the goods and services they need when they need them. If the need to borrow money is anticipated, the arrangements for borrowing can be made in advance of the need. But financial needs are sometimes not foreseen, and the extent of a financial need is not always known or knowable in advance. Furthermore, these arrangements are usually somewhat of a necessary inconvenience because they take time and effort to complete.

When an individual needs to borrow money, the lender will not only expect repayment but will also want to have confidence that the amount lent can be repaid on time. The effort by the borrower to provide the lender with this confidence level will depend on the amount lent. For example, a loan of less than one hundred dollars might be made simply on the basis of knowing that the individual to whom the money is lent has a job. For lending millions of dollars, the lender may want to take a security interest in assets that have a value in excess of the amount lent to cover fluctuations in the values of those assets during the time the loan is being repaid.

Not only will the borrower have an obligation to convince the lender that the borrower is creditworthy, the lender also has obligations to the borrower. For example, in consumer loans, laws require the lender to carefully explain certain aspects of the terms of the loan.

When time and foresight permit advance arrangement of loans, the act of borrowing can be made much simpler. When time is short and the need for the loan was not anticipated, the act of going through the process of borrowing may be so time-consuming that obtaining the loan may not be possible at all.

Typically, a business and an individual will either borrow relatively small amounts using credit cards, with pre-approved credit limits, or go to a lending institution for larger sums, where the process of completing documentation for borrowing money takes longer and is subject to conditions that must be fulfilled before the loan can be made. Naturally, for large loans, the safeguards for the lender take time. But for smaller loans, those above credit-card limits but still below a level where there might be a significant concern of the ability of the lender to repay the loan, there exists a need for greater convenience.

SUMMARY OF THE INVENTION

According to its major aspects and briefly stated, the present invention is a method and apparatus for closed loop processing of a loan application, including completion of the application, underwriting, and transferring of funds. The term "closed loop" means that all the steps involved in loan processing, including the steps of transferring the funds to the borrower and arranging for repayment as well as completing the loan application and underwriting it, can be done without human intervention. The apparatus uses a computer capability and a communications link, plus other electronic communications equipment, to enable the complete, automated processing of the application, namely, (1) the exchange of information with the applicant preferably using human voice recognition equipment, (2) the underwriting, meaning the evaluation and approval, of the loan, plus (3) initiating electronic transfer of funds from a source of funds to the deposit account designated by the applicant and (4) automatic withdrawals from the applicant's account to repay the loan.

The loan is initiated by an applicant via a variety of communication and electronic routes to make contact with the computer, which responds to the applicant and obtains information using voice communication processing. Information about the applicant is also obtained via electronic transfer of data to the computer from one or more databases, including those that provide name and address based on a caller's telephone number, and from credit bureaus that provide credit reports on an applicant given a name, a social security number and an address. In a preferred embodiment, the computer capability of the present invention also contains a "neural network" that is used to score the application, that is, to make a determination of whether to approve the loan based on a computer analysis of factors deemed important in assessing the would-be borrower's ability and willingness to repay the loan and to score the loan and assess the risk of it not being paid.

Finally, the loan agreement and related documentation are sent to the borrower by the fastest and most convenient means, including facsimile, direct transmission of electronic datafile to the borrower's personal computer via modem, overnight mail delivery service, and so on. The processing of the loan is done completely and automatically, with human intervention occurring only when the borrower is using a rotary dial telephone, makes too many entry mistakes, wants operator assistance, or the system suspects fraud.

The computer capability of the present invention includes voice communication processing, control processing including analysis and accessing information. These capabilities may be in separate computers or in a single, dedicated computer, perhaps with all capabilities built into a single microchip.

The user may access the system simply by telephone or in one or more other ways. For example, in a preferred embodiment, the user-interface is a kiosk housing a communication facility with a monitor and keypad (and perhaps a telephone), a facsimile machine for transmitting documentation from a remote or internal computer to the applicant once the transaction is complete, a bank card reader to identify an applicant, the applicant's bank and associated checking account routing information, and means for electronically transferring the signature of the borrower onto the loan agreement. The kiosk may be established at a convenient location, such as an airport terminal, a bank, a shopping area or a store selling goods that might carry a price higher than a typical credit card limit, such as a jewelry store or computer sales store, for example.

In an alternate embodiment of user interface, the loan process can be initiated with by agent, such as an insurance agent or financial planner. An agent may have a personal, "lap top" computer with a modem and facsimile machine for use in assisting the borrower in applying for a loan. An advantage of these channels for accessing the loan system of the present invention is the fact that insurance agents and financial planners are accustomed to handling important financial documentation.

An important feature of the present invention is the extent to which the loan is processed by computer. Computers are used to assist in processing loans routinely, but the extent of use here significantly exceeds that known in the art. Here, the processing by computer includes underwriting the loan application and deciding to make or deny the loan (or delay loan approval until more information is provided). The use of the computer to access certain information not within its own memory also eliminates the need for human-based processing. Avoiding human intervention not only saves processing time and reduces errors, but also eliminates bias in the decision to approve or deny the loan.

The use of a kiosk to make available to borrowers the communications capability for applying for a loan is another important feature of the present invention. Kiosks, placed in convenient locations, will contain electronic equipment that facilitates and speeds all of the steps in obtaining a loan. Importantly, because funds are deposited directly into the borrower's bank account rather than dispersed directly to the borrower from an automatic teller machine, the obtaining of funds from such a kiosk is safer than obtaining funds from a teller machine.

Another feature of the present invention related to the processing of the loan is the use of neural networks by a computer to make the decision that the borrower is likely repay the loan. Neural networks mimic the decision-making process of a human and, given the increase in loan processing productivity, are cost-effective. Neural networks in the preferred embodiment of the present invention make the lending decision, but in an alternative embodiment, are used to adjust periodically a more traditional scoring system.

Still another feature is the combination of automatic processing of a loan with direct deposit of funds and automatic withdrawal for repayment. These features enable the loan to be made on the same day in most cases, but at least by the next business day, and to give the lender some measure of control over repayment by facilitating automatic withdrawal thereby eliminating both delays in mailing payment checks and forgetfulness on the part of the borrower in making timely payments to the lender.

Other features and advantages will be apparent to those skilled in the art of automatic financial transactions from a careful reading of the Detailed Description of Preferred Embodiments accompanied by the Drawings.

DETAILED DESCRIPTION OF PREFERRED EMBODIMENTS

The present invention is a method and apparatus for making loans automatically, that is, a closed loop loan. By the term "automatically," it is meant that the application is received and processed, the decision made to grant or deny the loan, and the deposit of the loaned amount to the borrower's account is made entirely by computers in conjunction with voice and electronic communication equipment.

Figure 1:
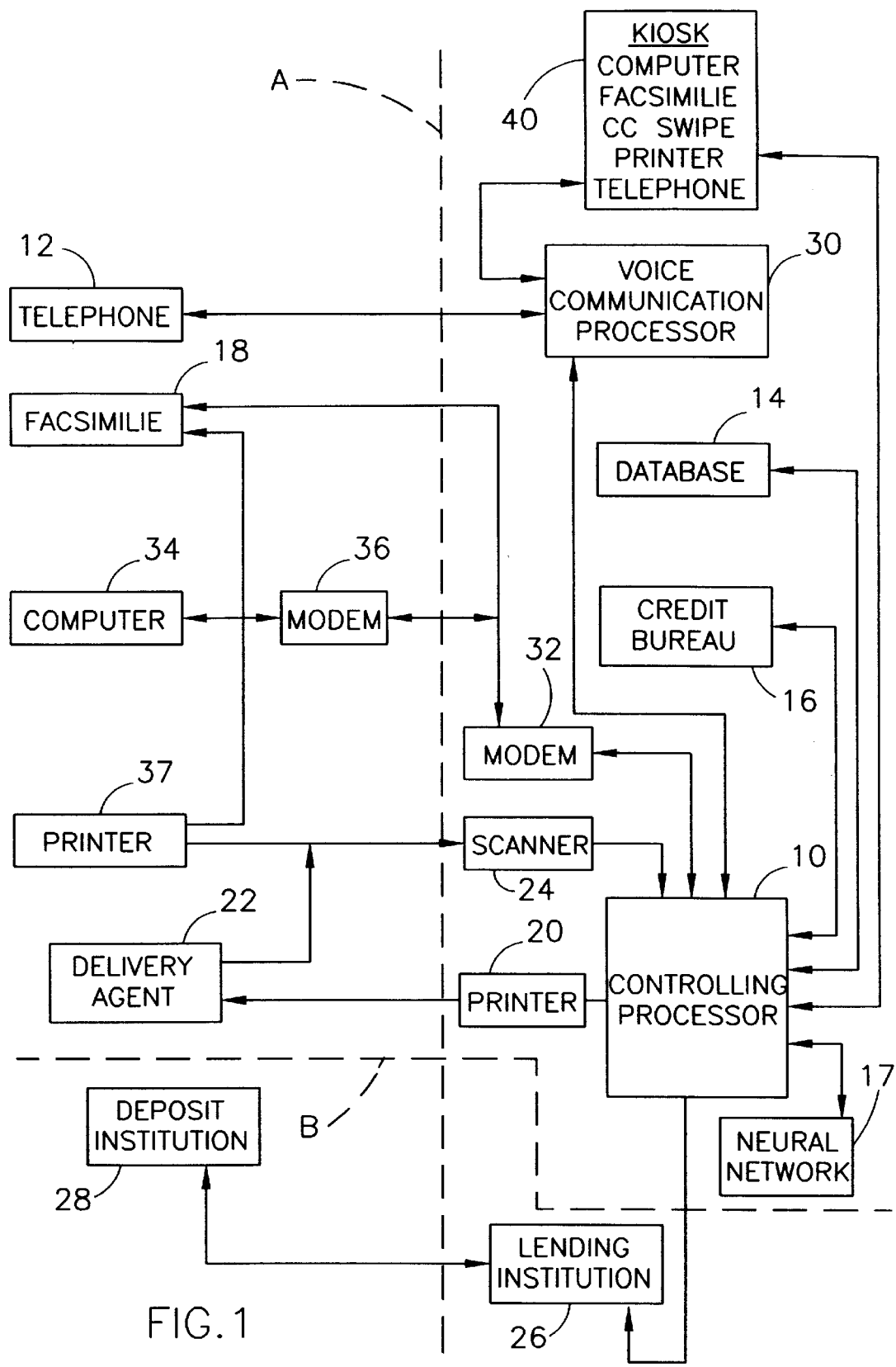
FIG. 1 is a flow chart depicting the major steps of an automatic financial lending system according to a preferred embodiment of the present invention.

FIG. 1 shows a schematic diagram according to a preferred embodiment of the present invention. Everything to the left of line A of FIG. 1 represents the equipment used by the loan applicant; everything above line B relates to the present invention; everything below line B is used with the present invention but is not part of the inventive combination. An important feature of the present invention is its flexibility in enabling the borrower to gain access to a system controller/processor 10 via a voice communication processor 30, and in a number of other different ways, in order to apply for the loan. Several of these ways will be described below, but for the present purposes, it will be assumed that the borrower is accessing communication processor 30 using a telephone 12 rather than using any more elaborate, electronic communications hardware over a communications link. A communications link is at least one telephone line, perhaps one or more dedicated line, in the kiosk embodiment to be described presently. Voice communication processor 30 is the interface between telephone 12 and controller/processor 10, enabling the controller/processor 10 to "talk" to the borrower over telephone 12, and in a preferred embodiment to be described presently, for the borrower to input responses to controller/processor 10 by speaking to communication processor 30.

It will also be assumed that the borrower is accessing communication processor 30 without assistance from either an employee of the lender or its agent, but these alternative embodiments will also be described below.

In its simplest embodiment and briefly stated, the process begins when the borrower calls communication processor 30 using telephone 12. Controller 10 obtains information in part from the calling borrower, via communications processor 30, and in part from a database 14 using the borrower's telephone number for identification. Controller 10 determines caller's name and address from database 14 based on the telephone number of the caller. Other than confirmation that the caller wants to apply for a loan, the amount desired, and the term, controller 10 initially needs only the loan applicant's name, address and social security number for identification. This information is used to obtain a credit report from a credit bureau 16.

The borrower's credit report is obtained from credit bureau 16 by controller 10, evaluated by a neural network 17, to be described more fully below, and a decision is made by neural network 17 in the form of a score and an associated risk factor to grant or deny the loan. Communication processor 30 informs the borrower of the decision and, if the loan is granted, arranges to get documentation that contains the terms of the loan to the borrower for signing.

The documentation can be sent both to and from the applicant completely or partway by facsimile 18 to reduce the transaction time. An agreement received by the applicant by facsimile 18 can be signed and returned by facsimile 18. Facsimile capability is not required, however. For example, if the caller has a personal computer 34, a modem 36 and a printer 37, then an electronic file of the documents can be transmitted to the caller, printed out on the caller's printer 37, signed and mailed back, or sent by facsimile if available. Alternatively, the loan agreement documents can be sent by facsimile to a nearby delivery agent 22 that can deliver them to the caller who can sign them, and then delivery agent 22 can send them back by facsimile. In this example, the execution of these documents can easily be effected the same day. Delivery agent 22 can be the U.S. Postal Service, a private delivery service, or an agent providing this service to the lending institution, such as an insurance agent or financial planner.

The executed documentation can also be received by controller/processor 10 in several ways, such as by an electronic file sent via modem 32, as a facsimile transmission that can be received directly into controller/processor 10, or as paper documents, sent by overnight mail, to be scanned into controller 10 with a scanner 24. If the documents are complete and signed, controller 10 arranges for electronic transfer of funds from a lending institution 26 directly to the borrower's account in a deposit institution 28 and, via communications processor 30, contacts the borrower to confirm the time and date of the transfer. The caller will repay the loan in installments automatically withdrawn from the deposit account by lending institution 26 or other institutions to which the loan might be assigned.

In the foregoing embodiment, communication processor 30 requires the following information from the caller: verification that the caller is calling about a loan, the loan amount, the term of the loan, verification of the caller's name and address and home/business telephone number, and the caller's social security number. This information is forwarded to controller 10 which then obtains other information from data base 14, including name and address corresponding to the telephone number of the caller. Finally, with the caller's name, address and social security number, controller 10 can obtain a credit report from credit bureau 16.

Communications processor 30 receives information from the caller over the communications link by instructing the caller to push buttons on telephone 12. Alternatively and preferably, processor 30 has a voice recognition processing capability for receiving and interpreting words spoken by the caller to the extent needed to process the loan. Communications processor 30 is programmed to speak with a synthesized or pre-recorded voice.

Communications processor 30 will obtain the telephone number of the caller using automatic number identification technology from the local telephone company or by asking the caller to input the number using the buttons on a "touch tone" telephone. The caller's telephone number is forwarded to controller 10. Controller 10 then uses this information to access database 14 for additional information regarding the caller. Data base 14 is one of several, currently available, commercial data bases to determine the address and name of a caller. These data bases are offered by Polk, R. R. Donnelley & Sons, MetroNet, and Telident, and can be accessed for use on a subscriber's system. Alternatively, and preferably, voice recognition using a voice communication processor 30 can be used to obtain the alphabet-based information, namely, address and name of the caller, directly from the caller and numerical information when the caller presses the touch tone telephone buttons in response to requests for the numerical information.

After confirming the caller's name and address from data base 14, and including perhaps a simple inquiry for verification of the name, number and address plus a request for the caller's zip code, communications processor 30 asks the caller/borrower for his social security number. While the credit report is being obtained from credit bureau 16 via controller 10, the amount of the loan and the preferred repayment schedule can be obtained by exchange of information with the caller and communications processor 30. With telephone 12, the caller can indicate yes or no to various questions by pressing the telephone buttons indicated for response by processor 30, or, if processor 30 has voice recognition capability, by simply saying yes or no over telephone 12.

When controller 10 has received the credit report, it sends the report via communications link to neural network 17 to begin the evaluation of the loan request. A neural network is the name generally given to a system designed to evaluate several, potentially-competing factors to arrive at a decision in the form of a score. The evaluation proceeds by iterating among a set of criteria that are weighted. In the present application, one criterion that may be used in deciding to grant the loan is that the applicant have a full time job; this criterion may in fact have the greatest weight. However, if the borrower owns a home and has several bank accounts, criteria directed toward these assets might outweigh the lack of a job.

Analyzing the loan application involves determining a score on which granting or denying the loan will be based. A typical scoring system simply assigns points to various factors that may be considered in the loan determination. Preferably, however, a neural network is used for making the loan determination or at least for updating on a periodic basis the point applied by a more traditional scoring system.

Neural network 17 is established by first identifying criteria that might have a bearing on the ability and willingness of the borrower to repay the loan. Then historical data are gathered to determine the influence, or weight, to be given to each criterion. The data are examined and the initial set of weighting factors are applied to develop estimates of the actual outcome of the data. The network's estimates are compared to the actual outcome and the weights are adjusted to make the estimates closer until the outcome predictions have been optimized. Neural network 17 uses information calculated from the credit report, such as the ratio of debt to liquidity. A neural network designer will also make a judgment on how few criteria are needed to make a sufficiently accurate prediction. There are commercially available computer programs, known to those skilled in the art of computer decision-making, that can be used to develop neural networks for the lending model by simply entering the criteria and initial weighting factors.

If the analysis of neural network 17 determines that the loan should be made, additional information is confirmed by communications processor 30 from data obtained from database 14 or credit bureau 16 or is obtained from the caller using communications processor 30, namely, the caller's deposit account number, the caller's facsimile number, the caller's acceptance of automatic withdrawal. Then, the terms and conditions of the loan must be established in writing and the borrower's signature obtained. Obtaining the signature of the borrower can be accomplished in several ways. If the borrower is being assisted in making the application for a loan by an insurance agent or financial planner with a personal computer and modem, or if the borrower is making the loan application from a kiosk, as will be described below, the signature can be obtained using an inkless "electronic pen" that, when the borrower makes a signature while holding the pen, recreates an image of the signature of the borrower on the signature line of the image of the documents displayed on the personal computer monitor. If the agent or planner has a printer 37, a copy of the executed documents can be printed out for the borrower and the electronic data file of the documents and signature transmitted back to controller/processor 10. In the case where a borrower has initiated the borrowing transaction from a kiosk, the signed documentation is printed out using a facsimile or a laser printer.

If the borrower is making the loan application by telephone, a copy of the documents can be sent to a nearby location by facsimile and delivered to the borrower by a delivery agent 22. Controller/processor 10 can also print out the loan agreement using printer 20 and mail it by overnight mail service to borrower.

The executed agreement, if received in paper form from the borrower, is scanned into controller by scanner 24 for examination of the signature block. If the agreement has been properly executed, the controller will issue an electronic instruction to a source of funds such as lending institution 26 to transfer electronically the loan amount to the borrower's bank account at deposit institution 28. Before the deposit is made, however, there are several checks made to prevent fraud, including verification of signature as well as comparison of information obtained from the borrower with that available from a credit report, such as date of birth and the number of years with a present employer. Part of the terms of the lending agreement include permission from the borrower for the lender to make an automatic, periodic withdrawal from the borrower's bank account for repaying the loan. The automatic direct deposit by electronic fund transfer to and the automatic withdrawal of payment from the borrower's deposit account are especially important features of the present invention because they eliminate portions of the process from human control and delays. Also, if the borrower has an immediate need for the loan, direct deposit will make these funds available as quickly as possible, avoiding delays resulting from mailing, lost checks, the time taken for a check to clear, and the need to go to the deposit institution to make the deposit. Any documentation requiring the borrower's signature, including consumer lending disclosure information, will be handled as discussed previously.

No human needs to intercede in most cases. Communication processor 30 communicates with the borrower and controller 10 extracts information from data base 14 and credit bureau 16; neural network 17 makes the decision to lend and controller 10 arranges for the lending agreement to be signed. Controller 10 effects the electronic fund transfer and arranges for automatic withdrawal of monthly payments. If the caller requires help while communicating with communications processor 30, pressing # or 0 will result in automated messages or an attendant, respectively, to assist the caller. Pressing * will repeat the previous sequence for the caller. If the caller seems confused, communications processor 30 will interrupt the processes and provide attendant assistance or a telephone number for attendant assistance.

In an alternate embodiment, borrowers can apply for a loan using a personal computer 34 and a modem 36 by contacting controller 10 via telephone 12 through a communications link. Controller 10 will interact using the monitor of computer 34 to prompt the borrower who can type in the information needed and indicate responses to controller 10 for the latter to obtain the credit report and process the loan. The document can be received via modem 36 into computer 34, printed using printer 37. The documentation can be returned to controller 10 by facsimile 18 when the borrower is so equipped.

As an example of the prompting that can be done, communications processor 30 can ask: "Are you currently employed? Press 1, if yes; 2, if no.", "How much is your monthly income?", or "How much do you spend per month?" This information, provided by way of example, would be available from a credit report but can be confirmed by prompting a response. Alternatively, if the information is asked and the responses, based on a partial analysis, indicate that the loan cannot be made, the borrower can be so informed and the time, need and cost of obtaining a credit report can be avoided.

The answers to the prompts can be input by the borrower by pressing buttons on a telephone, keying entries in a personal computer by an insurance agent or financial planner or by the borrower's own personal computer or using the special keypad in a kiosk.

In a related alternative embodiment, an agent of the lender can assist the borrower in applying and can provide the electronic communications equipment. For example, insurance agents and financial planners can assist borrowers in processing loans. Most borrowers are located near an insurance agent's office and such agents frequently visit private homes as a part of their insurance work.

Not every loan decision will be clear. In the event the analysis by neural network 17 is inconclusive, the borrower will be called back by communications processor 30 and asked for an additional business day to qualify the loan application and, if the request if granted, the time for the return call will be arranged.

If the loan can be granted, communications processor 30 (or controller 10 if the borrower is using a personal computer) will confirm the amount that can be loaned, the monthly payment and the term of the loan. The disclosures required under applicable consumer lending laws and other documentation can be signed in ink or, in a kiosk, using an electronic pen and then returned by facsimile, by electronic data file transmission, or by overnight mail.

The controller/processor 10 via the communication processor 30 will review with the borrower the information relevant to the loan, such as the account number to which the direct deposit will be made and the name of the deposit institution, the account number and name of the automatic withdrawal institution, the date of the month and the first month the automatic withdrawal will begin, the address and payee if the check is not intended for deposit into an account, late charges that could apply, the finance charge, the annual percentage rate, the total cost of all the payments, and the total amount financed. This information needed from the borrower regarding his or her accounts can be obtained by communications processor 30 as neural network is making the determination to make the loan, or the borrower can indicate a telephone number where he or she can be reached for a call back after the loan is approved so any additional information can be obtained then.

If the loan is to be secured by collateral, the collateral needs to be identified and its value determined. If the item being purchased can serve as collateral, that fact can be confirmed via communications processor 30 as well as the identity of the goods and their whereabouts and location of title or a bill of sale.

Figure 2:
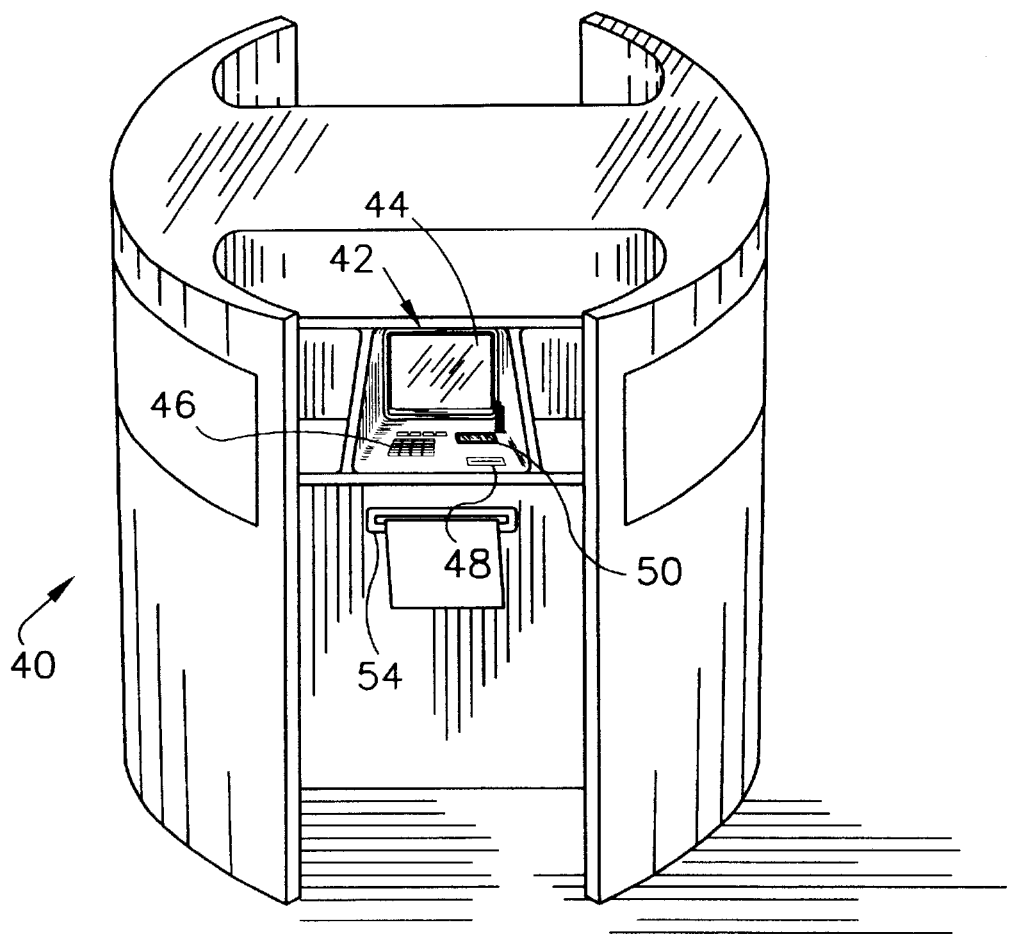
FIG. 2 is a perspective view of a kiosk according to a preferred embodiment of the present invention.
Figure 3:
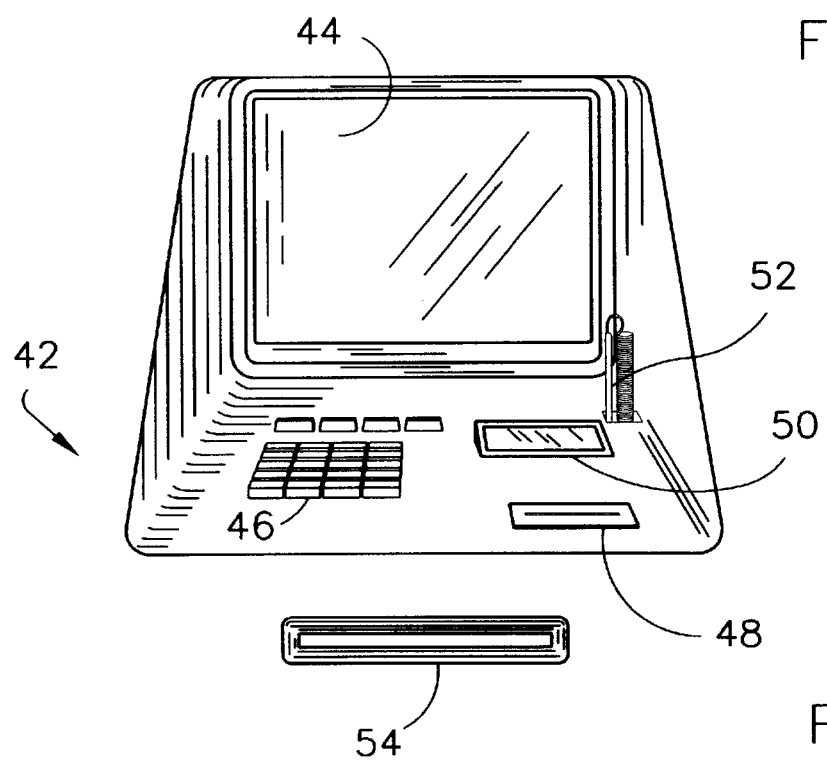
FIG. 3 is a front view of a portion of the kiosk of FIG. 2 according to a preferred embodiment of the present invention.

The preferred embodiment for enabling a borrower to make a loan application is in the form of a kiosk. FIGS. 2 and 3 depict a kiosk 40 for use by an applicant in initiating a loan. A kiosk is basically a housing that can contain all of the equipment for a borrower to use in contacting and communicating with a remote, centrally located processor 10, or, alternatively, it contains processor 10. Kiosk 40 has a computer 42 with a monitor 44, a keyboard 46, a magnetic bank card reader 48 that enables a bank card to be read to identify an applicant as well as the applicant's bank and corresponding checking account, an internal facsimile with communications link (not shown in FIGS. 2 and 3) and, in a preferred embodiment, means for transferring a signature to a document such as electronic signature block 50 and electronic pen 52. Block 50 is a surface that converts the motion of electronic pen 52 as borrower holds it and goes through the motions of making a signature to an electronic image of a signature and transfers it electronically to computer 42. The image of the signature can also be used by the lending institution to verify the borrower's signature before the direct deposit is made.

An applicant will enter kiosk 40 and indicate using keyboard 46 his interest in a loan. He will be prompted by computer 42 via monitor 44 to run a bank card through bank card reader 48 to identify himself or alternatively may simply enter his name, address and social security number. Computer 42 will forward information to controller 10 via a communications link which will access one or more databases, such as credit bureau 16 to obtain a credit report. As before, the information obtained from the applicant and from the credit report will be scored. Preferably using neural network 17, to determine whether or not to approve the loan. If approved, the applicant will be so informed and the loan information provided. The signature of the applicant can be obtained using block 50 and pen 52, and a signed copy of the agreement printed out for the applicant by a facsimile 54. Meanwhile, the time of the effectiveness of the electronic transfer of funds will have been arranged and communicated to applicant as well as obtaining of his permission to have his deposit account automatically debited to repay the loan.

It will be apparent to those skilled in the art that many modifications and substitutions may be made to the foregoing preferred embodiment without departing from the spirit and scope of the present invention which is defined by the following claims.

What is claimed is:

1. An automatic loan processing system providing real time loan processing without human intervention for applicants located at a remote interface, said system comprising:
   a. a remote applicant interface adapted to:
      i. allow a loan applicant to remotely request a loan; and
      ii. receive data from the loan applicant;
   b. a data processing system with associated memory having weighted underwriting criteria bearing on the ability and willingness of a borrower to repay a loan based on prescribed data obtained from the borrower and information about the borrower from at least one database containing information about the borrower relevant to the ability and willingness of the borrower to repay a loan;
   c. a communication network electronically coupling said data processing system to said applicant interface and facilitating access from said data processing system to the at least one database to facilitate data transfer therebetween;
   d. without human assistance, said data processing system adapted to:
      i. receive the data from the loan applicant received at the applicant interface;
      ii. access the at least one database for information relevant to the loan applicant's identity and for information relevant to the loan applicant's ability and willingness to repay the loan;
      iii. verify the loan applicant's identity by comparing certain of the information received from the loan applicant with certain of the information received from said at least one database relevant to the applicant's identity;
      iv. compare certain of the information received from the loan applicant and certain of the information received from said at least one database relevant to the applicant's ability and willingness to repay the loan with said weighted underwriting criteria to provide an underwriting score;
      v. based on the underwriting score, determine in real time and without human assistance if the loan applicant's requested loan is approved or rejected, and
      vi. send a result to the remote applicant interface informing the loan applicant that the requested loan was approved or rejected.

2. The automatic loan processing system of claim 1 wherein said communication network is electronically coupled to a printer located in a place accessible to the applicant for delivering loan documentation to the applicant.

3. The automatic loan processing system of claim 1 wherein said data processing system is further adapted to effect an electronic funds transfer of an approved loan amount from the lending institution's account to the applicant's account.

4. The automatic loan processing system of claim 1 wherein said data processing system is further adapted to periodically effect an electronic funds transfer of an approved payment amount from the applicant's account to the lending institution's account for automatic repayment.

5. The automatic loan processing system of claim 1 wherein said applicant interface is a public kiosk laving a data input means and display.

6. The automatic loan processing system of claim 1 wherein the at least one database includes credit bureau information relating to the applicant.

7. The automatic loan processing system of claim 1 wherein said remote applicant interface includes a display and said data processing system is configured to transmit and image of a loan agreement to said remote applicant interface for display on said display.

8. The automatic loan processing system of claim 1 wherein said remote applicant interface includes voice recognition means for receiving aural applicant data.

9. The automatic loan processing system of claim 1 wherein said remote applicant interface includes means for electronically recording a signature of the applicant, said remote applicant interface adapted to transfer an electronic signature to the data processing system.

10. The automatic loan processing system of claim 1 wherein said remote applicant interface includes a scanner for scanning images of documents, said remote applicant interface adapted to transfer an electronic image to the data processing system.

11. The automatic loan processing system of claim 1 wherein said remote applicant interface includes a card reader for reading information from a bank card, said remote applicant interface adapted to transfer the bank card information to the data processing system.

12. The automatic loan processing system of claim 1 wherein said remote applicant interface includes a telephone.

13. An automatic loan processing system providing real time loan processing without human intervention for applicants located at a remote interface, said system comprising:
   a. a remote applicant interface adapted to:
      i. allow a loan applicant to remotely request a loan; and
      ii. receive data from the loan applicant;

b. a data processing system with associated memory having weighted underwriting criteria bearing on the ability and willingness of a borrower to repay a loan based on prescribed data obtained from the borrower and information about the borrower from at least one database containing information about the borrower relevant to the ability and willingness of the borrower to repay a loan;

c. a communication network electronically coupling said data processing system to said applicant interface and facilitating access from said data processing system to the at least one database to facilitate data transfer therebetween;

d. without human assistance, said data processing system adapted to:
  i. receive the data from the loan applicant received at the applicant interface;
  ii. access information for the loan applicant in said at least one database;
  iii. receive the information about the loan applicant relevant to the ability and willingness of the applicant to repay the loan;
  iv. compare certain of the information received from the loan applicant and about the loan applicant with said weighted underwriting criteria bearing on the ability and willingness of a borrower to repay a loan based on prescribed data obtained from the borrower and information about the borrower from said at least one database to provide an underwriting score;
  v. based on the underwriting score, determine in real time and without human assistance if the loan applicant's requested loan is:
    a. approved,
    b. rejected, or
    c. indeterminable without human assistance and requires human assistance for further processing;
  vi. send a result to the remote applicant interface informing the loan applicant that the requested loan was approved, rejected or indeterminable.

14. The automatic loan processing system of claim 13 wherein said information received from at least one said database includes information relevant to the identification of the loan applicant and said data processing system is adapted to verify an identity of the loan applicant by comparing certain of the information received from the loan applicant with certain of the information received from said at least one database, said data processing system adapted to require verification of the applicant's identity prior to approving the loan request.

15. The automatic loan processing system of claim 13 wherein said communication network is electronically coupled to a printer located in a place accessible to the applicant for delivering loan documentation to the applicant.

16. The automatic loan processing system of claim 13 wherein said data processing system is further adapted to effect an electronic funds transfer of an approved loan amount from the lending institution's account to the applicant's account.

17. The automatic loan processing system of claim 13 wherein said data processing system is further adapted to periodically effect an electronic funds transfer of an approved payment amount from the applicant's account to the lending institution's account for automatic repayment.

18. The automatic loan processing system of claim 13 wherein said applicant interface is a public kiosk having a data input means and display.

19. An automatic loan processing method providing real time loan processing without human intervention for applicants located at a remote interface, the method comprising:

a. receiving data from a loan applicant at a remote applicant interface;

b. transferring loan applicant data from the remote applicant interface to a data processing system;

c. accessing at least one database for information relevant to the loan applicant's identity and for information relevant to the loan applicant's ability and willingness to repay the loan;

d. verifying the loan applicant's identity by comparing certain of the information received from the loan applicant with certain of the information received from the at least one database relevant to the applicant's identity;

e. comparing certain of the information received from the loan applicant and certain of the information received from the at least one database relevant to the applicant's ability and willingness to repay the loan with weighted underwriting criteria to provide an underwriting score;

f. based on the underwriting score, determining in real time and without human assistance if the loan applicant's requested loan is approved or rejected; and g. sending a result to the remote applicant interface informing the loan applicant that the requested loan was approved or rejected.

20. The automatic loan processing method of claim 19 further comprising the step of delivering loan documentation to the applicant.

21. The automatic loan processing method claim 19 further comprising the step of effecting an electronic funds transfer of an approved loan amount from the lending institution's account to the applicant's account.

22. The automatic loan processing method of claim 19 further comprising the step of periodically effecting an electronic funds transfer of an approved payment amount from the applicant's account to the lending institution's account for automatic repayment.

23. The automatic loan processing method of claim 19 further comprising the steps of:
  a. electronically recording a signature of the applicant at the remote applicant interface; and
  b. transferring an electronic signature from the remote applicant interface to the data processing system.

24. The automatic loan processing method of claim 19 further comprising the steps of:
  a. scanning an image of a document at the remote applicant interface; and
  b. transferring an electronic image of the document from the remote applicant interface to the data processing system.

25. The automatic loan processing method of claim 19 further comprising the steps of:
  a. scanning an image of a document at the remote applicant interface; and
  b. transferring an electronic image of the document from the remote applicant interface to the data processing system.

26. An automatic loan processing method providing real time loan processing without human intervention for applicants located at a remote interface, the method comprising:

a. receiving data from a loan applicant at a remote applicant interface;

b. transferring loan applicant data from the remote applicant interface to a data processing system;

c. accessing at least one database for information relevant to the loan applicant's identity and for information relevant to the Loan applicant's ability and willingness to repay the loan;

d. comparing certain of the information received from the loan applicant certain of the information received from the at least one database relevant to the applicant's ability and willingness to repay the loan with weighted underwriting criteria to provide an underwriting score;

e. based on the underwriting score, determining in real time and without human assistance if the loan applicant's requested loan is i) approved, ii) rejected, or iii) if neither approved nor rejected, indeterminable without human assistance and requires human assistance for further processing; and f. sending a result to the remote applicant interface informing the loan applicant that the requested loan was approved or rejected.

27. The automatic loan processing method of claim 26 further comprising the step of delivering loan documentation to the applicant.

28. The automatic loan processing method claim 26 further comprising the step of effecting an electronic funds transfer of an approved loan amount from the lending institution's account to the applicant's account.

29. The automatic loan processing method of claim 26 further comprising the step of periodically effecting an electronic funds transfer of an approved payment amount from the applicant's account to the lending institution's account for automatic repayment.

30. The automatic loan processing method of claim 26 further comprising the steps of:

a. electronically recording a signature of the applicant at the remote applicant interface; and b. transferring an electronic signature from the remote applicant interface to the data processing system.

* * * * *

(12) REEXAMINATION CERTIFICATE (4726th)

United States Patent
Norris

(10) Number: US 5,870,721 C1
(45) Certificate Issued: Jan. 28, 2003

(54) SYSTEM AND METHOD FOR REAL TIME LOAN APPROVAL

(75) Inventor: Jeffrey A. Norris, Lexington, SC (US)

(73) Assignee: Affinity Technology Group, Inc., Columbia, SC (US)

Reexamination Request:
No. 90/005,311, Apr. 1, 1999

Reexamination Certificate for:
Patent No.: 5,870,721
Issued: Feb. 9, 1999
Appl. No.: 08/729,892
Filed: Oct. 15, 1996

Related U.S. Application Data

(63) Continuation of application No. 08/346,350, filed on Nov. 29, 1994, now abandoned, which is a continuation of application No. 08/113,205, filed on Aug. 27, 1993, now abandoned.

(51) Int. Cl.⁷ .................................... G06F 17/60
(52) U.S. Cl. ........................ 705/38; 705/35; 705/39; 705/42; 705/43
(58) Field of Search ..................... 705/1, 26, 30, 705/35, 38, 39, 40, 70, 42, 43; 379/93.12; 235/381–385

(56) References Cited

U.S. PATENT DOCUMENTS

| | | |
|---|---|---|
| 4,947,028 A | 8/1990 | Gorog |
| 5,120,906 A | 6/1992 | Protheroe et al. |
| 5,239,462 A | 8/1993 | Jones et al. |
| 5,262,941 A | 11/1993 | Saladin et al. |
| 5,383,113 A | 1/1995 | Kight et al. |
| 5,576,951 A | 11/1996 | Lockwood |
| 5,774,882 A | 6/1998 | Keen et al. |

FOREIGN PATENT DOCUMENTS

JP    404195256 A   *   7/1992

OTHER PUBLICATIONS

Lawrence, J., "*Untangling Neural Nets (When one model is better than another?)*," Online Version, Apr. 1990.
U.S. patent application Ser. No. 07/752,026, Lockwood, filed Aug. 29, 1991.
U.S. patent application Ser. No. 07/850,028, Keen et al., filed Mar. 12, 1992.
Chain Store Age Executive v68n7 (Section 2) PP:14–15, Dialog file 15, Accession No. 00727315, Jul. 1992.*
"Credit decision cut down to 10 minutes", Bank Advertising News, Dialog file 16, Accession No. 02350568, Nov. 13, 1989.*
Berzof, Ken, "Kiosk Issues Bank Cards for thos Dashing Through Doug", The Courier–Journal (Louisville, KY, US), V269 N155 sB p12, Dialog file 635, Accession No. 0117523, 1989.*

* cited by examiner

*Primary Examiner*—Vincent Millin

(57) ABSTRACT

A method and apparatus for closed loop, automatic processing a loan, including completion of the application, underwriting, and transferring funds, includes use of a programmed computer to interface with an applicant, obtain the information needed to process the loan, determine whether to approve the loan, and effect electronic fund transfers to the applicant's deposit account and arrange for automatic withdrawals to repay the loan. Information is received from the applicant preferably by using voice recognition technology but alternatively by entering the alphanumeric information using a personal computer keyboard or using the buttons on a telephone. The loan approval determination is made using a neural network with input obtained in part from the applicant and in part from databases accessed by the computer, such as a credit bureau, to obtain a credit report. The loan agreement is transmitted by facsimile to and from the applicant when the applicant has access to a facsimile machine or datafile to be printed or to an agent who delivers the agreement to the applicant when the applicant does not have access. In a preferred embodiment, the applicant accesses the computer from a kiosk where the complete transaction can take place as the applicant waits.

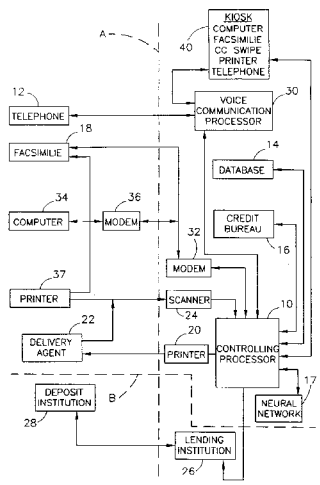

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 13, 16, 19, 21, 26 and 28 are determined to be patentable as amended.

Claims 2, 4–12, 14, 15, 17, 18, 20, 22–25, 27, 29 and 30, dependent on an amended claim, are determined to be patentable.

1. An automatic load processing system providing [real time] *closed loop* loan processing without human intervention for applicants located at a remote interface, said system comprising:
 a. a remote applicant interface adapted to:
  i. allow a loan applicant to remotely request a loan; and
  ii. receive data from the loan applicant;
 b. a data processing system with associated memory having weighted underwriting criteria bearing on the ability and willingness of a borrower to repay a loan based on prescribed data obtained from the borrower and information about the borrower from at least one database containing information about the borrower relevant to the ability and willingness of the borrower to repay a loan;
 c. a communication network electronically coupling said data processing system to said applicant interface and facilitating access from said data processing system to the at least one database to facilitate data transfer therebetween;
 d. without human assistance, said data processing system adapted to:
  i. receive the data from the loan applicant received at the applicant interface;
  ii. access the at least one database for information relevant to the loan applicant's identity and for information relevant to the loan applicant's ability and willingness to repay the loan;
  iii. verify the loan applicant's identity by comparing certain of the information received from the loan applicant with certain of the information received from said at least one database relevant to the applicant's identity;
  iv. compare certain of the information received from the loan applicant and certain of the information received from said at least one database relevant to the applicant's ability and willingness to repay the loan with said weighted underwriting criteria to provide an underwriting score;
  v. based on the underwriting score, determine in [real time and] *closed loop* without human assistance if the loan applicant's requested loan is approved or rejected[, and]*;*
  vi. send a result to the remote applicant interface informing the loan applicant that the requested loan was approved or rejected*; and*
  vii. *if the requested loan is approved and accepted by the loan applicant, issue proceeds for the loan as requested by the loan applicant in closed loop without further instruction.*

3. The automatic loan processing system of claim 1 wherein said data processing system is further adapted to [effect] *issue the proceeds by effecting* an electronic funds transfer of an approved loan amount from the lending institution's account to the applicant's account.

13. An automatic loan processing system providing [real time] *closed loop* loan processing without human intervention for applicants located at a remote interface, said system comprising:
 a. a remote applicant interface adapted to:
  i. allow a loan applicant to remotely request a loan; and
  ii. receive data from the loan applicant;
 b. a data processing system with associated memory having weighted underwriting criteria bearing on the ability and willingness of a borrower to repay a loan based on prescribed data obtained from the borrower and information about the borrower from at least one database containing information about the borrower relevant to the ability and willingness of the borrower to repay a loan;
 c. a communication network electronically coupling said data processing system to said applicant interface and facilitating access from said data processing system to the at least one database to facilitate data transfer therebetween;
 d. without human assistance, said data processing system adapted to:
  i. receive the data from the loan applicant received at the applicant interface;
  ii. access information for the loan applicant in said at least one database;
  iii. receive the information about the loan applicant relevant to the ability and willingness of the applicant to repay the loan;
  iv. compare certain of the information received from the loan applicant and about the loan applicant with said weighted underwriting criteria bearing on the ability and willingness of a borrower to repay a loan based on prescribed data obtained from the borrower and information about the borrower from said at least one database to provide an underwriting score;
  v. based on the underwriting score, determine in [real time and] *closed loop* without human assistance if the loan applicant's requested loan is:
   a. approved,
   b. rejected, or
   c. indeterminable without human assistance and requires human assistance for further processing;
  vi. send a result to the remote applicant interface informing the loan applicant that the requested loan was approved, rejected or indeterminable*; and*
  vii. *if the requested loan is approved and accepted by the loan applicant, issue proceeds for the loan as requested by the loan applicant in closed loop without further instruction.*

16. The automatic loan processing system of claim 13 wherein said data processing system is further adapted to [effect] *issue the proceeds by effecting* an electronic funds transfer of an approved loan amount from the lending institution's account to the applicant's account.

19. An automatic loan processing method providing [real time] *closed loop* loan processing without human intervention for applicants located at a remote interface, the method comprising:

a. receiving data from a loan applicant at a remote applicant interface;
b. transferring loan applicant data from the remote applicant interface to a data processing system;
c. accessing at least one database for information relevant to the loan applicant's identity and for information relevant to the loan applicant's ability and willingness to repay the loan;
d. verifying the loan applicant's identity by comparing certain of the information received from the loan applicant with certain of the information received from the at least one database relevant to the applicant's identity;
e. comparing certain of the information received from the loan applicant and certain of the information received from the at least one database relevant to the applicant's ability and willingness to repay the loan with weighted underwriting criteria to provide an underwriting score;
f. based on the underwriting score, determining in [real time and] *closed loop* without human assistance if the loan applicant's requested loan is approved or rejected; [and]
g. sending a result to the remote applicant interface informing the loan applicant that the requested loan was approved or rejected; *and*
h. *if the requested loan is approved and accepted by the loan applicant, issuing proceeds for the loan as requested by the loan applicant in closed loop without further instruction.*

21. The automatic loan processing method claim 19 [further comprising the step of] *wherein the issuing step includes* effecting an electronic funds transfer of an approved loan amount from the lending institution's account to the applicant's account.

26. An automatic loan processing method providing [real time] *closed loop* loan processing without human intervention for applicants located at a remote interface, the method comprising:

a. receiving data from a loan applicant at a remote applicant interface;
b. transferring loan applicant data from the remote applicant interface to a data processing system;
c. accessing at least one database for information relevant to the loan applicant's identity and for information relevent to the Loan applicant's ability and willingness to repay the loan;
d. comparing certain of the information received from the loan applicant certain of the information received from the at least one database relevant to the applicant's ability and willingness to repay the loan with weighted underwriting criteria to provide an underwriting score;
e. based on the underwriting score, determining in [real time and] *closed loop* without human assistance if the loan applicant's requested loan is i) approved, ii) rejected, or iii) if neither approved nor rejected, indeterminable without human assistance and requires human assistance for further processing; [and]
f. sending a result to the remote applicant interface informing the loan applicant that the requested loan was approved or rejected; *and*
g. *if the requested loan is approved and accepted by the loan applicant, issuing proceeds for the loan as requested by the loan applicant in closed loop without further instruction.*

28. The automatic loan processing method claim 26 [further comprising the step of] *wherein the issuing step includes* effecting an electronic funds transfer of an approved loan amount from the lending institution's account to the applicant's account.

* * * * *